(12) United States Patent
Patel et al.

(10) Patent No.: US 11,537,274 B2
(45) Date of Patent: Dec. 27, 2022

(54) SYSTEMS AND METHODS FOR FEATURE INGESTION AND MANAGEMENT

(71) Applicant: Walmart Apollo, LLC, Bentonville, AR (US)

(72) Inventors: Malay Patel, Fremont, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/163,470

(22) Filed: Jan. 31, 2021

(65) Prior Publication Data
US 2022/0244821 A1    Aug. 4, 2022

(51) Int. Cl.
| G06F 9/451 | (2018.01) |
| G06F 16/2455 | (2019.01) |
| G06F 3/00 | (2006.01) |
| G06F 3/0484 | (2022.01) |
| H04L 67/306 | (2022.01) |

(52) U.S. Cl.
CPC ............ *G06F 3/0484* (2013.01); *G06F 9/451* (2018.02); *G06F 16/24552* (2019.01); *G06F 16/24568* (2019.01); *H04L 67/306* (2013.01)

(58) Field of Classification Search
CPC .. G06F 3/0484; G06F 9/451; G06F 16/24568; G06F 16/24552; H04L 67/306
USPC .................................................. 715/744, 742
See application file for complete search history.

(56) References Cited

U.S. PATENT DOCUMENTS

| 8,527,452 B2 * | 9/2013 | Klinger .................. G06N 5/025 706/60 |
| 9,070,156 B2 | 6/2015 | Linden et al. |
| 10,536,580 B2 | 1/2020 | Puri et al. |
| 2007/0033187 A1 * | 2/2007 | Friedman .............. G06F 16/338 |
| 2018/0253219 A1 | 9/2018 | Dotan-Cohen et al. |

OTHER PUBLICATIONS

Shruti Deshpande, Apache Kafka Vs Apache Spark: Know the Differences, Published Apr. 2022 via Knowledgehut solutions, pp. 1-12 (pdf).*

Adi Hirschtein, Real-Time Feature Engineering with a Feature store, Published Dec. 16, 2020 via Towards Data Science, pp. 1-11 (pdf).*

(Continued)

*Primary Examiner* — Manglesh M Patel
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform receiving a sequence of actions entered into a GUI before an account action for a user account of a user during a user session initiated via a first user portal; dividing the sequence of actions into actions for real-time features and actions for periodic features; simultaneously (1) storing the actions for the periodic features in a distributed cloud storage system and (2) processing the actions for the real-time features into the real-time features; and simultaneously storing the periodic features and the real-time features in a database managed by real-time stream processing software.

20 Claims, 6 Drawing Sheets

(56) References Cited

OTHER PUBLICATIONS

Adi Hirschtein, Building Real-Time ML Pipelines with a Feature Store, Published Jan. 13, 2021 via Feature stores for ML, pp. 1-10 (pdf).*

Amazon Elasticache for Redis, accessed Jan. 22, 2021 at https://aws.amazon.com/elasticache/redis—12 pgs.

* cited by examiner

SYSTEMS AND METHODS FOR FEATURE INGESTION AND MANAGEMENT

TECHNICAL FIELD

This disclosure relates to machine learning algorithms, and more particularly to real time feature ingestion and management.

BACKGROUND

Machine learning algorithms (e.g., unsupervised learning, deep learning, supervised learning, etc.) are becoming more commonplace in today's computer systems, but, as their ubiquity continues to grow, many problems have started to arise. One problem for computer systems running machine learning algorithms is that storing and managing the data needed to operate these models has become cumbersome for a number of reasons. Notably, large amounts of data need to be captured, processed, and stored in a standardized way for use by downstream machine learning models before that data becomes stale and outdated. For example, past systems for feature storage and ingestion have used distributed systems to ingest, process, and store features. These distributed systems created a number of bottlenecks for feature ingestion, processing, and storage.

One bottleneck can occur when messages containing user action data and user feature data are received from managed databases (e.g., an Apache Kafka® managed database). Because previous systems were distributed and did not tie messages to a common identifier, these messages from managed databases are read by multiple virtual machines ("VMs") and one by one in sequence. Often, due to latency in the system, these messages were read out of sequence. Not only did this design create a processing bottleneck of one database message at a time for each VM, but solving this problem by spinning up additional VMs was computationally intensive and could quickly overwhelm a system's available resources during bursts of user activity. Further, spinning up additional VMs did not solve all problems with previous feature ingestion and management systems, and even went as far as exacerbating some problems. For example, increasing the number of VMs also increases the rate at which a write by one virtual machine can overwrite writes of another virtual machine. As another example, race conditions would often arise when real-time features were pushed to a storage system (e.g., a managed database and/or a cloud cache) at the same time as periodic features. This can then lead to an instance where data written to various storage systems (e.g., a hard disk or a cache) was incomplete and/or inaccurate, thereby leading to poor predictions by downstream machine learning algorithms.

In view of the above, there is a need for an improved system and/or method for feature ingestion and management.

BRIEF DESCRIPTION OF THE DRAWINGS

To facilitate further description of the embodiments, the following drawings are provided in which.

Figure 1:
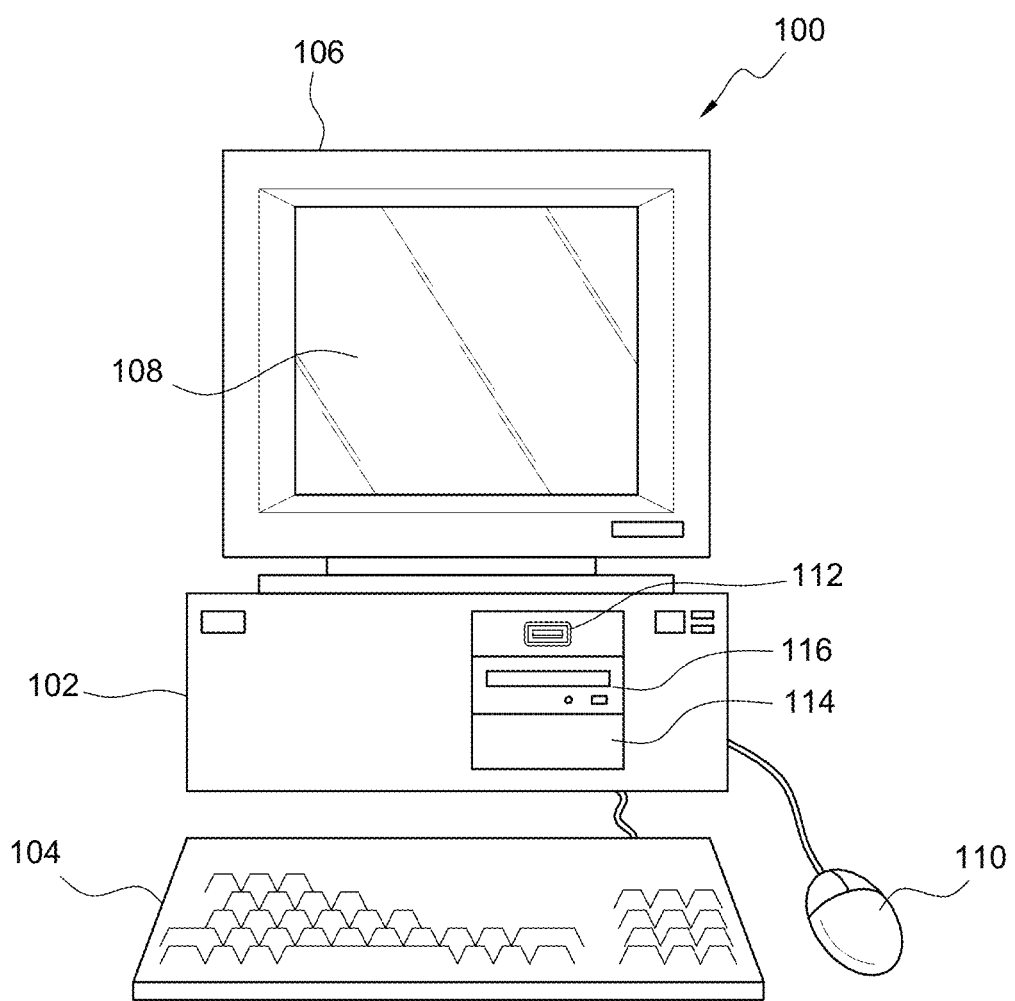
FIG. 1 illustrates a front elevational view of a computer system that is suitable for implementing various embodiments of the systems disclosed in FIGS. 3-4 and 6.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving a sequence of actions entered into a GUI before an account action for a user account of a user during a user session initiated via a first user portal; dividing the sequence of actions into actions for real-time features and actions for periodic features; simultaneously (1) storing the actions for the periodic features in a distributed cloud storage system and (2) processing the actions for the real-time features into the real-time features; and simultaneously storing the periodic features and the real-time features in a database managed by real-time stream processing software.

Various embodiments include a method. The method can be implemented via execution of computing instructions configured to run at one or more processors and configured to be stored at non-transitory computer-readable media The method can comprise receiving a sequence of actions entered into a GUI before an account action for a user account of a user during a user session initiated via a first user portal; dividing the sequence of actions into actions for real-time features and actions for periodic features; simultaneously (1) storing the actions for the periodic features in a distributed cloud storage system and (2) processing the actions for the real-time features into the real-time features; and simultaneously storing the periodic features and the real-time features in a database managed by real-time stream processing software.

Figure 2:
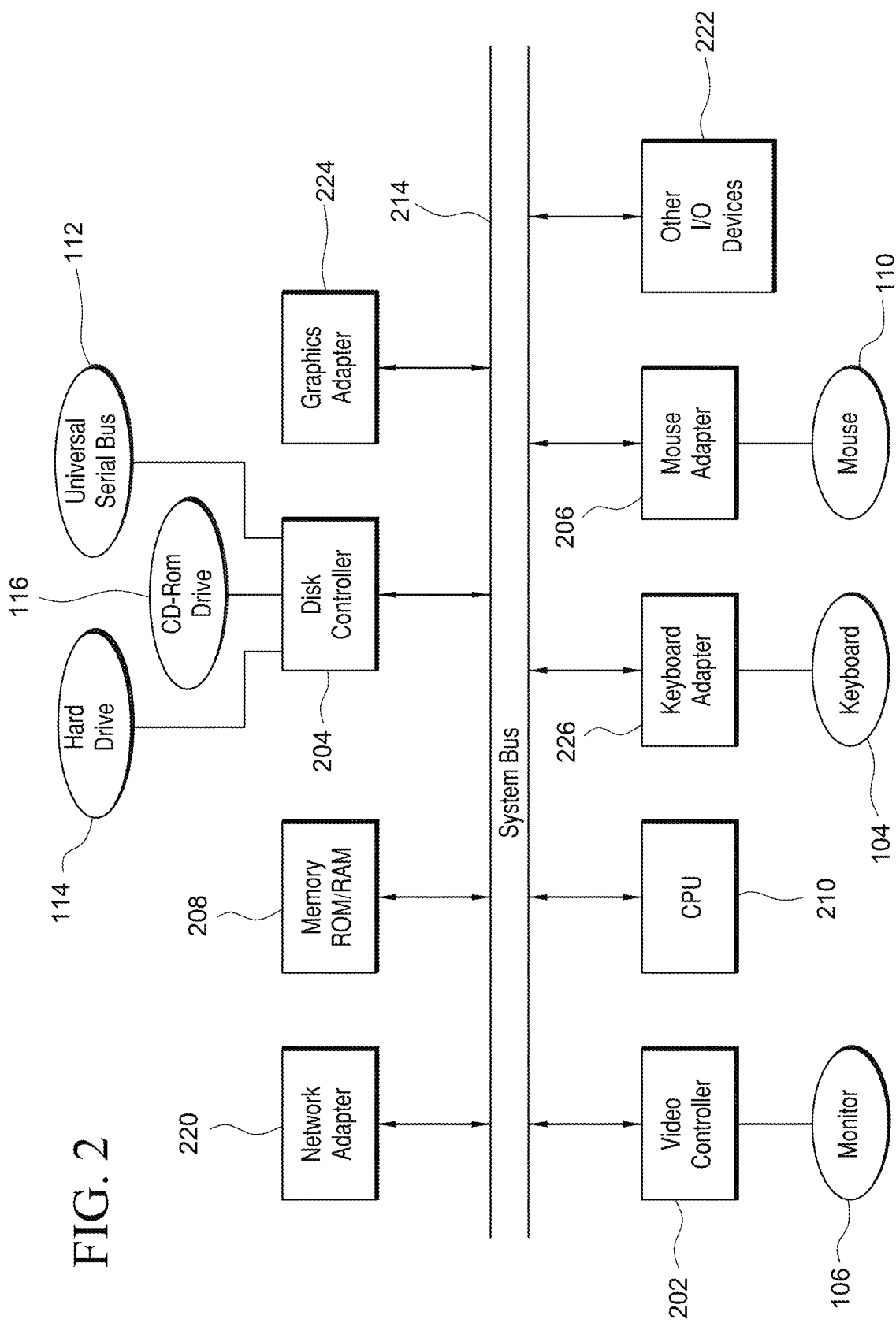
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
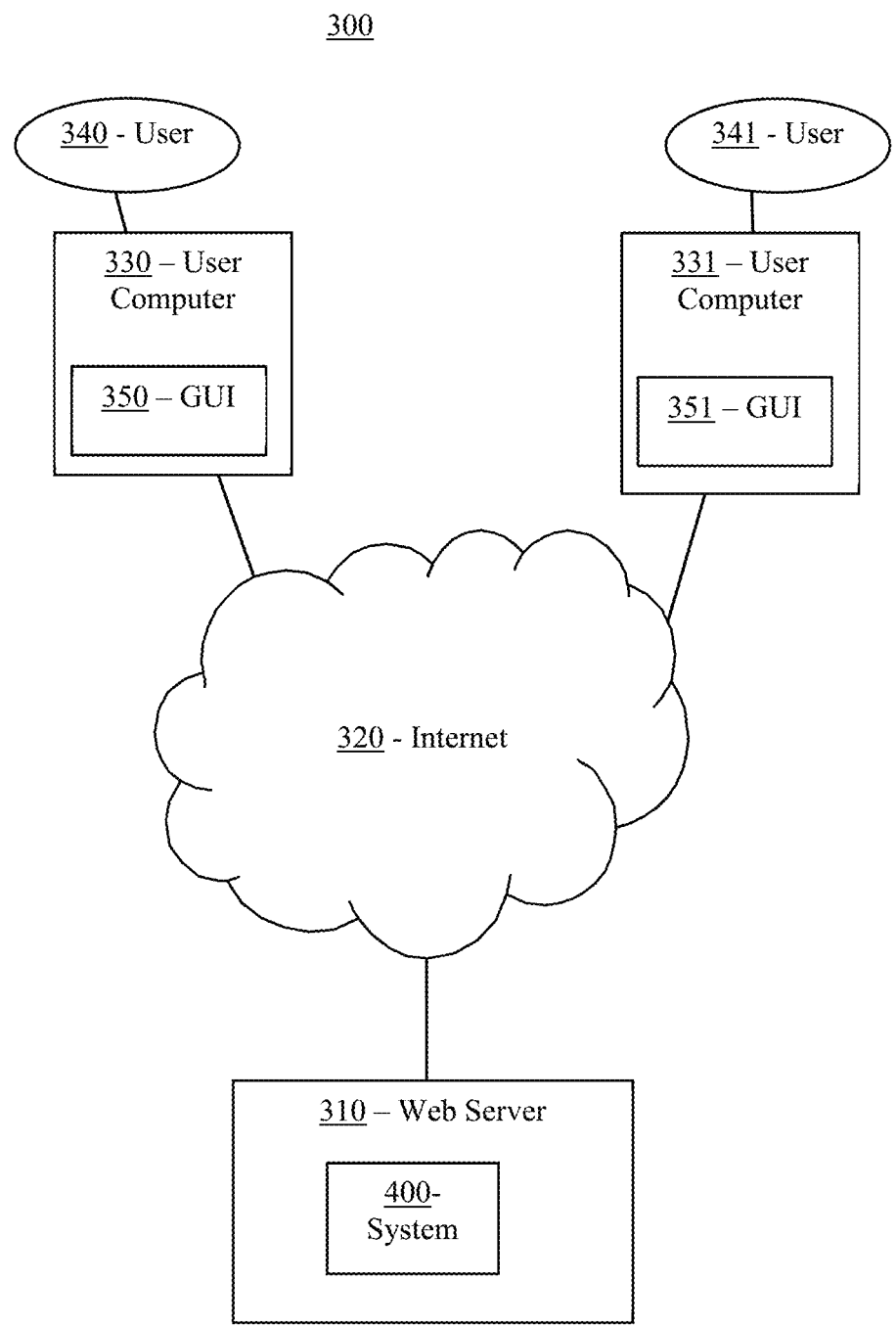
FIG. 3 illustrates a representative block diagram of a system, according to an embodiment.

Turning ahead in the drawings, FIG. 3 illustrates a block diagram of a system 300 that can be employed for feature ingestion and management, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For example, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise GUI 350, 351. In the same or different embodiments, GUI 350, 351 can be part of and/or displayed by user computers 330, 331, which also can be part of system 300. In some embodiments, GUI 350, 351 can comprise text and/or graphics (images) based user interfaces. In the same or different embodiments, GUI 350, 351 can comprise a heads up display ("HUD"). When GUI 350, 351 comprises a HUD, GUI 350, 351 can be projected onto a medium (e.g., glass, plastic, etc.), displayed in midair as a hologram, or displayed on a display (e.g., monitor 106 (FIG. 1)). In various embodiments, GUI 350, 351 can be color, black and white, and/or greyscale. In many embodiments, GUI 350, 351 can comprise an application running on a computer system, such as computer system 100 (FIG. 1), and/or user computers 330, 331. In the same or different embodiments, GUI 350, 351 can comprise a website accessed through internet 320. In some embodiments, GUI 350, 351 can comprise an eCommerce website. In the same or different embodiments, GUI 350, 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc. In many embodiments, GUI 350, 351 can comprise one or more GUI elements. In various embodiments, a GUI element can be selectable by a user 340, 341 and/or interactive.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities. In many embodiments, web server 310 can also host one or more feature processing and storage systems. For example, web server 310 can comprise all or a portion of host system 400.

In many embodiments, web server 310 and user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 and/or user computers 330, 331 can be configured to communicate with one another. In various embodiments, web server 310 and/or user computers 330, 331 can communicate or interface (e.g., interact) with each other through a network or internet 320. In these or other embodiments, internet 320 can be an intranet that is not open to the public. In further embodiments, Internet 320 can be a mesh network of individual systems. Accordingly, in many embodiments, web server 310 (and/or the software used by such systems) can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 also can be configured to communicate with one or more databases. In various embodiments, one or more databases can comprise a product database that contains information about products, items, or SKUs (stock keeping units) sold by a retailer. In many embodiments, one or more databases can comprise information about interactions of user computers 330, 331 with GUIs 350, 351. For example, the one or more databases can store past (e.g., historical) interactions of user computers 330, 331 with GUIs 350, 351. In many embodiments, interactions can be tied to a unique identifier (e.g., an IP address, an advertising ID, device ID, cookie ID, etc.) and/or a user account. In embodiments where a user 340, 341 interacts with GUIs 350, 351 before logging into a user account, data stored in the one or more database that is associated with a unique identifier can be merged with and/or associated with data associated with the user account. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). In some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a high-capacity cache (e.g., MegaCache) for immediate retrieval on-demand.

In many embodiments, one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310, user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide for an improved system for feature ingestion, processing, and storage. These techniques described herein can provide a significant improvement over conventional approaches of feature ingestion, processing, and storage, such as using a distributed system. In many embodiments, the techniques described herein can beneficially make determinations based on dynamic information that describes current conditions and/or conditions that have occurred during a single user session. In this way, the techniques described herein can avoid problems with stale and/or outdated machine learned models by continually updating their training data.

In a number of embodiments, the techniques described herein can solve a technical problem that arises only within the realm of computer networks, as feature ingestion, processing, and storage does not exist outside the realm of computer networks.

Figure 4:
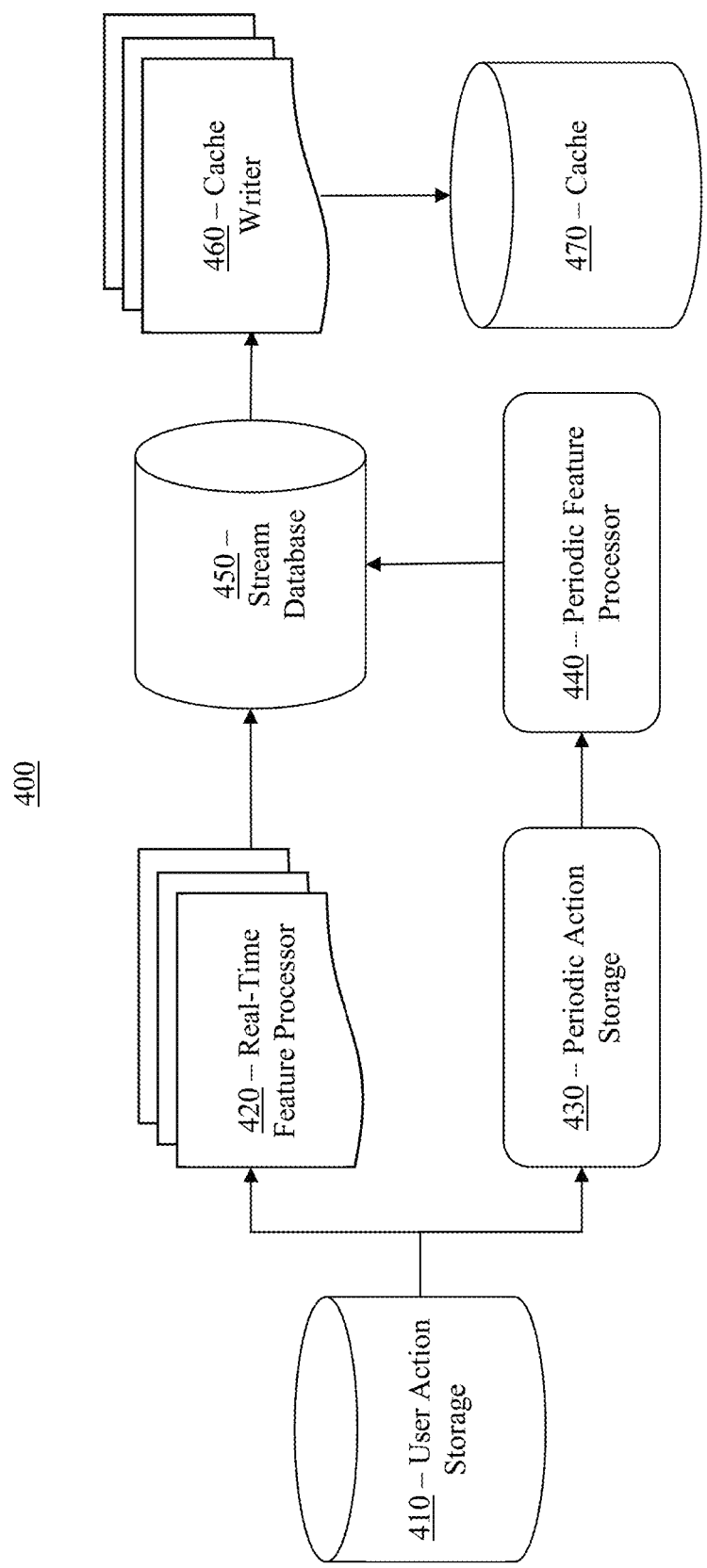
FIG. 4 illustrates a representative block diagram of a portion of the system of FIG. 3, according to an embodiment.

Turning ahead in the drawings, FIG. 4 illustrates a block diagram of a portion of system 400 comprising user action storage 410, real-time feature processor 420, periodic action storage 430, periodic feature processor 440, stream database 450, cache writer 460, and cache 470. In various embodiments, one or more of user action storage 410, real-time feature processor 420, periodic action storage 430, periodic feature processor 440, stream database 450, cache writer 460, and cache 470 can be implemented by one or more computer systems (e.g., system 100 (FIG. 1)). In these or other embodiments, user action storage 410, real-time feature processor 420, periodic action storage 430, periodic feature processor 440, stream database 450, cache writer 460, and cache 470 can be in communication with each other via various types of networks described with reference to system 300 (FIG. 3) (e.g., internet 320 (FIG. 3)). In many embodiments, system 400 can be implemented by all or a portion of system 300 (FIG. 3). For example, system 400 can be implemented entirely on web server 310 (FIG. 3) or can be implemented partially on user computers 330, 331 and partially on web server 310.

Each of user action storage 410, real-time feature processor 420, periodic action storage 430, periodic feature processor 440, stream database 450, cache writer 460, and cache 470 is merely exemplary and not limited to the embodiments presented herein. Each of user action storage 410, real-time feature processor 420, periodic action storage 430, periodic feature processor 440, stream database 450, cache writer 460, and cache 470 can be employed in many different embodiments or examples not specifically depicted or described herein. In some embodiments, certain elements or modules of user action storage 410, real-time feature processor 420, periodic action storage 430, periodic feature processor 440, stream database 450, cache writer 460, and cache 470 can perform various procedures, processes, and/or acts. In other embodiments, the procedures, processes, and/or acts can be performed by other suitable elements or modules.

In many embodiments, user action storage 410 can be configured to receive and/or store actions of one or more users. In various embodiments, user actions can comprise interactions with a GUI that occur during a user session. For example, user actions can comprise interactions with a website during a browsing session on the website. As another example, in-session user activity can comprise interactions with a computer program that occur beginning from when the program is opened to when the program is closed. It will be understood that while many user sessions end when a GUI is closed (e.g., by navigating away from a website or closing a program), user sessions can persist after closure of the GUI. For example, it can be considered one user session when a user opens a GUI, closes the GUI, and then a short time later re-opens the GUI. In many embodiments, a user session can continue across multiple access portals (e.g., an application, a website, a mobile device, a desktop computer, a wearable user device, a specific type of operating system, etc.). What is considered a user session can be determined by an administrator of system 300 (FIG. 3) based on the specifications and/or constraints of the system and its administrator. In many embodiments, user actions can be associated with one or more unique IDs For example, user actions can be associated with an IP address, an advertising ID, a device ID, etc. In these or other embodiments, user actions can be associated with a user account. In many embodiments, a user session can continue across multiple unique IDs and a single user account. For example, when a user browses a website before being logged into a user account, and then subsequently logs into the user account, actions from the user session can be associated with both a unique ID and the user account.

In many embodiments, actions can be streamed to user action storage 410 from one or more GUIs (e.g. GUIs 351, 352 (FIG. 3)). In these embodiments, user action storage 410 can be managed by real-time stream processing software (e.g., Apache Kafka®). In various embodiments, real-time stream processing software can be configured to divide one or more streams of actions from one or more user devices into various categorizations and subcategorizations (known as "topics" and "partitions" in an Apache Kafka® managed system) based on their content. In many embodiments, data in user action storage 410 can be combined and/or grouped together based on unique ID and/or a user account. In this way, events from various devices and/or sessions can be combined into a unified stream, so that downstream modules can efficiently process and store the data.

In many embodiments, real-time feature processor 420 can be configured to access user action data stored in user action storage 410 and convert these user actions into features. For example, real-time feature processor 420 can filter and/or concatenate one or more user actions to form a feature for that user. As another example, real-time feature processor 420 can be configured to create one or more embeddings from data stored in user action storage 410. In many embodiments, real-time feature processor 420 can be configured to process actions and create real-time features (e.g., reactive features). In these or other embodiments, a real-time feature can comprise a feature that is used to create a prediction during a single user session. For example, many predictive algorithms use real-time features to determine an in-session intent of a user, and then modify one or more GUI elements in view of that in-session intent. As another example, a real-time feature can comprise an account action feature. In these or other embodiments, an account level feature can be created in response to receiving an account action from a user account. In some embodiments, an account action can comprise one or more of logging into or out of an existing user account, registering a new user account, upgrading a user account (e.g., from trial to paid or from a lower tier to a higher tier), and/or cancelling a user account. In these or other embodiments, more than one real-time feature processor 420 can be used in system 400.

In many embodiments, each feature processor can be configured to create a different feature, and an administrator of system 400 can add additional real-time feature processors as specified. In many embodiments, real-time feature processor 420 can be built using the Java® programming language. In some embodiments, real-time feature processor 420 can be deployed as a service which continuously consumes managed database streams (e.g., from user action storage 410). In many embodiments, a real-time feature constructed by real-time feature processor 420 can be streamed to a stream database 450 (e.g., to a partitioned Apache Kafka® database).

In many embodiments, periodic action storage 430 can be configured to store user action data received from user action storage 410. In various embodiments, periodic action storage 430 can be managed or implemented by software configured for large scale data storage and processing (e.g., Apache Spark®). In some embodiments, periodic action storage 430 can be implemented using a distributed network comprising distributed memory architecture. This distributed architecture can reduce the impact on the network and system resources to reduce congestion in bottlenecks while still allowing data to be accessible from a central location. In many embodiments, periodic action storage 430 can be accessible via cloud computing (e.g., via internet 320 (FIG. 3)). In these or other embodiments, periodic action storage 430 can comprise one or more extractors that access user action data and extract actions for building periodic features. An extractor can be implemented using software configured for large scale data storage and processing (e.g., Apache Spark®). In these or other embodiments, software configured for large scale data storage and processing can periodically extract and build features from data user action storage 410. In many embodiments, a periodic feature can comprise a feature that is constructed on a periodic basis. For example, some features evolve over time (e.g., stages in pregnancy), and therefore can be predicted on a daily, weekly, and/or monthly basis. As a further example, construction of a periodic feature can be computationally intensive and/or require a large amount of data. In these or other embodiments, feature construction can be scheduled for a time as specified by an administrator (e.g., during periods of low activity on system 400 or when a certain amount of user action data from user action storage 410 has been received).

In many embodiments, periodic feature processor 440 can be configured to access user action data stored in periodic action storage 430 and convert these user actions into periodic features. For example, periodic feature processor 440 can filter and/or concatenate one or more user actions to form a feature for that user. As another example, periodic feature processor 440 can be configured to create one or more embeddings from data stored in periodic action storage 430. In many embodiments, periodic feature processor 440 can be configured to process actions and create periodic features. In these or other embodiments, more than one periodic feature processor 440 can be used in system 400. In some embodiments, more than one periodic feature processor 440 can be placed in sequence, thereby creating a more refined and/or complex feature. In many embodiments, periodic feature processor can be managed or implemented by software configured for large scale data storage and processing (e.g., Apache Spark®).

In many embodiments, system 400 does not need a system component for real-time feature storage between user action storage 410 and real-time feature processor 420, in the same way that periodic action storage 430 is used between user action storage 410 and periodic feature processor 440. In many embodiments, this storage component can be omitted because real-time stream processor 420 builds features quickly. In these or other embodiments, a feature can be built quickly because involves minimal or no correlation with other events. In this way, system 400 can avoid redundant or additional storage layers that can increase system latency and cost.

In many embodiments, stream database 450 can be configured to store one or more features as created by real-time feature processor 420 and/or periodic feature processor 440. In many embodiments, real-time feature processor 420 and/or periodic feature processor 440 can continually stream features to stream database 450 and they create and/or update features. In various embodiments, real-time feature processor 420 and/or periodic feature processor 440 can simultaneously stream features to stream database 450. In these embodiments, stream database 450 can be managed by real-time stream processing software (e.g., Apache Kafka®). In various embodiments, real-time stream processing software can be configured to divide one or more streams of features from real-time feature processor 420 and/or periodic feature processor 440 into various categorizations and subcategorizations (known as "topics" and "partitions" in an Apache Kafka® managed system) based on their content. For example, a key value, unique ID, or user account can be used to tie messages to a specific user. In these or other embodiments, features in stream database 450 can be categorized and/or partitioned by unique ID and/or user account. In these embodiments, stream database 450 can serve as a funnel where real-time features and periodic features are joined and/or grouped together before being transferred to other elements of system 400. In many embodiments, stream database 450 can group individual features for a user in sequence within a partition. This sequences can then be accessed cache writer 460 in a correct sequence. In this way, using stream database can prevent feature data in cache 470 from being overwritten, thereby providing for more accurate predictions by downstream machine learning algorithms. In many embodiments, stream database can be run in active-active mode. In various embodiments, active-active mode can comprise a data processing paradigm where a data source (e.g. a networked server and/or stream database 450) aggregates data and distributes it to one or more downstream processes (e.g., a load balancer and/or cache writer 460). These downstream processes can then load the data to a cache (e.g., cache 470), where it can be accessed by one or more requesting entities (e.g., a machine learning algorithm).

In many embodiments, cache writer 460 can be configured to access feature data stored in stream database 450 and write it to cache 470. In these or other embodiments, cache writer 460 can process feature data before writing it to cache 470. For example, cache writer 460 can split features into one or more portions by type and then store them in a specific cache for that feature type. As another example, cache writer 460 can be configured to merge real-time features that were created before a user logs into a user account (e.g., figures tied to one or more unique IDs) with other features for the user account. As an additional example, cache writer 460 can be configured to merge features from different access portals using one or more of a unique ID or a user account. As a further example, cache writer 460 can enable system 400 to identify state transitions of a user that depend on an incoming feature and a state of a feature already in in cache 470 (e.g., a user moving between membership tiers). In this way, cache writer 460 enables downstream machine learning algorithms to get a full picture of a user's activity before making predictions. In many embodiments, there can be multiple instances of cache writer 460 running simultaneously in system 400. In some of these embodiments, each cache writer 460 can be configured to write a different feature to cache 470 and/or to an individual cache instance (e.g., a cache instance for a specific user). In various embodiments, additional instances of cache writer 460 can be started when requested by system 400. For example, a new cache writer can be started for each user who interacts with a GUI streaming to user action storage 410 and/or for each downstream predictive algorithm that accesses cache 470.

In many embodiments, cache 470 can be configured to store and make available user features for various downstream machine learning algorithms. In these or other embodiments, cache 470 can comprise a large capacity cache (e.g., Mega Cache). In many embodiments, a large capacity cache can be configured to have a storage on the order of multiple terabytes. In these or other embodiments, a large capacity cache can be configured to scale its writes and/or reads to an order of millions per second. In various embodiments, a large capacity cache can be configured to be read with latency on a millisecond order. In various embodiments, a large capacity cache can be distributed across multiple processing and/or storage nodes. In these embodiments, a large capacity cache can have at least one node per geographic region. In many embodiments, cache 470 stores the real-time features so that system 400 can access these features more quickly than if such features were stored only in stream database 450. The periodic features do not need to be stored in cache 470 because these features are either not used as often or not used soon compared to the real-time features, which can help to reduce the minimum size of cache 470 that is needed by system 400, which in turn can help to reduce the cost of system 400. However, periodic features can be stored in cache 470, which can help to improve the speed of system 400 compared to an embodiment where the periodic features are not stored in cache 470 and instead read from distributed periodic action storage 430 and/or stream database 450.

Figure 5:
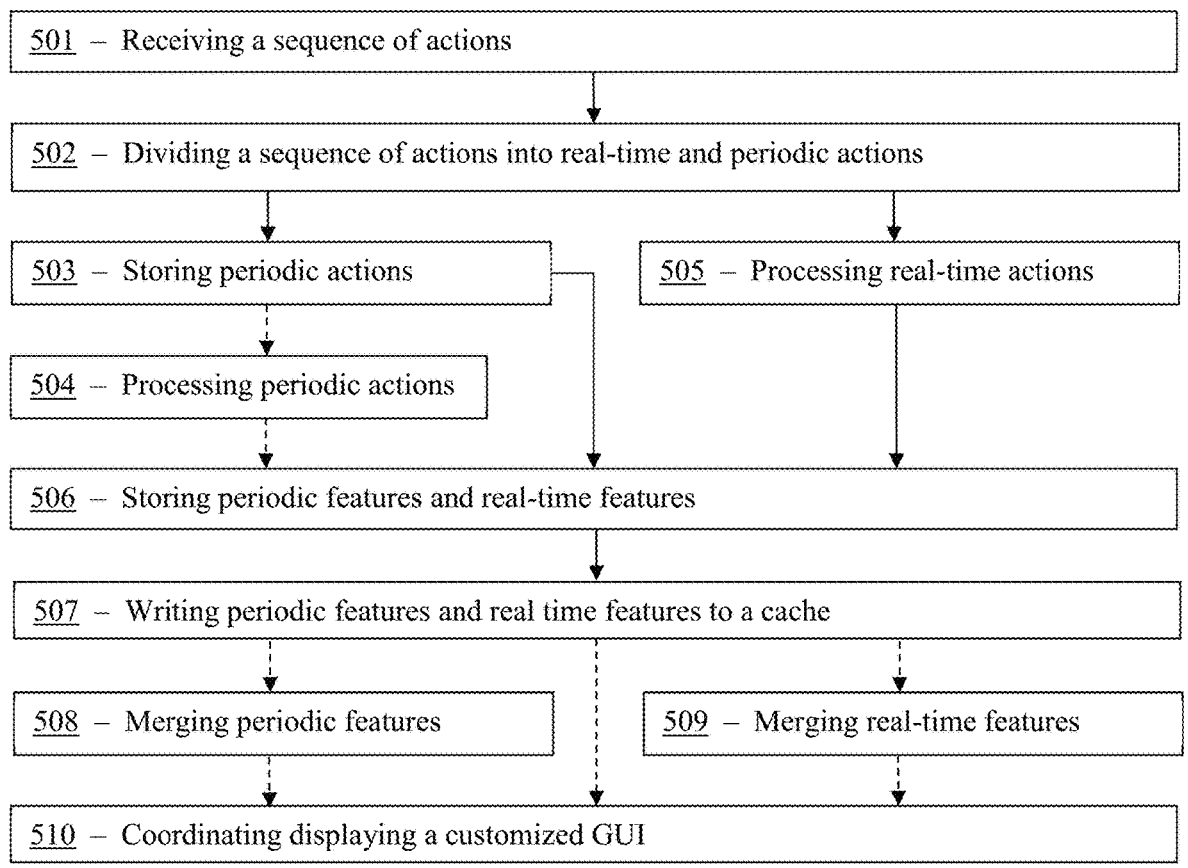
FIG. 5 illustrates a flowchart for a method, according to certain embodiments.

Turning ahead in the drawings, FIG. 5 illustrates a flow chart for a method 500, according to an embodiment. Method 500 is merely exemplary and is not limited to the embodiments presented herein. Method 500 can be employed in many different embodiments or examples not specifically depicted or described herein. In some embodiments, the activities of method 500 can be performed in the order presented. In other embodiments, the activities of method 500 can be performed in any suitable order. In still other embodiments, one or more of the activities of method 500 can be combined or skipped. In many embodiments, all or a portion of system 300 (FIG. 3) and/or system 400 (FIG. 4) can be suitable to perform method 500 or one or more of the activities of method 500. In these or other embodiments, one or more of the activities of method 500 can be implemented as one or more computer instructions configured to run at one or more processing modules and configured to be stored at one or more non-transitory memory storage modules. Such non-transitory memory storage modules can be part of a computer system such as web server 310 or user computers 330, 331 (FIG. 3). The processing module(s) can be similar or identical to the processing module(s) described above with respect to computer system 100 (FIG. 1).

In many embodiments, method 500 can comprise an activity 501 of receiving a sequence of actions. In various embodiments, a sequence of actions can be received from user action storage 410 (FIG. 4). In various embodiments, an action can be associated with one or more user IDs and/or user accounts. In these or other embodiments, an action can comprise an account action, as described above. In some embodiments, one or more actions of the sequence of actions can be received before an account action (e.g., be tied to a unique ID). In many embodiments, a sequence of actions for one or more user sessions can be received.

In many embodiments, method 500 can comprise an activity 502 of dividing a sequence of actions into real-time and periodic actions. In many embodiments, real-time feature processor 420 can identify features that require minimal computation and not constrained by complex correlation within large set of data which otherwise change the system throughput for the real-time feature builder. The system also considers the recency requirement of the feature in order to enable the downstream machine learning algorithm to yield best result In these or other embodiments, one or more extractors, as described with reference to periodic action storage 430 (FIG. 4) can read a sequence of actions and extract actions needed for building periodic features.

In many embodiments, method 500 can comprise an activity 503 of storing periodic actions. In these or other embodiments, periodic actions can be stored in periodic action storage 430 (FIG. 4) or another similarly configured storage system. In various embodiments, activity 503 can performed at the same time (e.g., simultaneously) as activity 505 described below.

In some embodiments, method 500 can optionally comprise activity 504 of processing periodic actions. In some embodiments, activity 504 can be performed as a part of or at the same time as activity 503. In these or other embodiments, periodic actions can be processed into periodic features. In many embodiments, feature processor 440 (FIG. 4) can process periodic actions into periodic features. In various embodiments, activity 504 can be performed at the same time as (e.g. simultaneously with) activity 505.

In many embodiments, method 500 can comprise an activity 505 of processing real-time actions. In these or other embodiments, real-time actions can be processed into real-time features. In many embodiments, real-time feature processor 420 (FIG. 4) can process real-time actions into real-time features. In various embodiments, activity 505 can be performed at the same time as (e.g. simultaneously with and/or in parallel with) one or more of activities 503-504.

In many embodiments, method 500 can comprise an activity 506 of storing periodic features and real-time features. In these or other embodiments, periodic features and real-time features can be stored in stream database 450 (FIG. 4).

In many embodiments, method 500 can comprise an activity 507 of writing periodic features and real time features to a cache. In various embodiments, cache writer 460 (FIG. 4) can write periodic features and real time features to a cache.

In some embodiments, method 500 can optionally comprise activity 508 of merging periodic features. In various embodiments, activity 508 can be performed at the same time or as a part of activities 507 and/or 509. In these or other embodiments, cache writer 460 (FIG. 4) can merge periodic features. For example, cache writer 460 (FIG. 4) can merge one or more periodic features when a user logs into a user account.

In some embodiments, method 500 can optionally comprise activity 509 of merging real-time features. In various embodiments, activity 509 can be performed at the same time or as a part of activities 507-508. In these or other embodiments, cache writer 460 can merge real-time features. For example, cache writer 460 can merge one or more real-time features when a user logs into a user account.

In some embodiments, method 500 can optionally comprise activity 510 of coordinating displaying a customized GUI. In many embodiments, a customized GUI can be generated by one or more machine learning algorithms. In various embodiments, coordinating displaying a customized GUI can comprise customizing a GUI element. In the same or different embodiments, customizing a GUI element can comprise altering an image displayed on the GUI, altering text on the GUI, altering a layout of the GUI, changing a type of the GUI, displaying an advertisement on the GUI, displaying no advertisement on the GUI, altering a color displayed on the GUI, etc. In many embodiments, displaying a customized GUI can comprise displaying certain content at specific times. In these or other embodiments, a GUI element can comprise advertisements for products, services, and/or events. In various embodiments, a customized GUI transmitted for display during activity 510 can be related to a predicted intent or action of a user, as determined by one or more machine learning algorithms. In many embodiments, a GUI transmitted for display during activity 510 can be optimized in order to facilitate a predicted intent of a user or "nudge" a user towards performing an action predicted by a machine learning algorithm. In many embodiments, a predicted action can be an action that is likely to be performed after an action performed in a user session. In these or other embodiments, a customized GUI can be configured to enable a user to more efficiently perform complex predicted actions on devices where accessing the predicted action would involve laborious navigation and/or complex on-screen inputs. For example, commands that would normally be buried within sub-menus or subsequent GUIs can be added to a customized GUI in a prominent area. As another example, information used to perform predicted actions can be displayed in a summary form on a customized GUI.

In many embodiments, a machine learning algorithm can be trained on periodic features and real-time features. In some embodiments, training a machine learning algorithm can comprise estimating internal parameters of a model configured to predict a subsequent action of a user with a GUI. In the same or different embodiments, a pre-trained machine learning algorithm can be used, and the pre-trained algorithm can be re-trained on periodic features and/or real-time features. In some embodiments, a machine learning model can be continually re-trained as periodic features and real-time features are added to a cache. In various embodiments, a machine learning algorithm can be trained, at least in part, on a single user's (e.g., user 340) periodic features and real-time features or the single user's periodic features and real-time features can be weighted in a training data set. In this way, a machine learning algorithm tailored to a single user can be generated. In the same or different embodiments, a machine learning algorithm tailored to a single user can be used as a pre-trained algorithm for a similar user.

Figure 6:
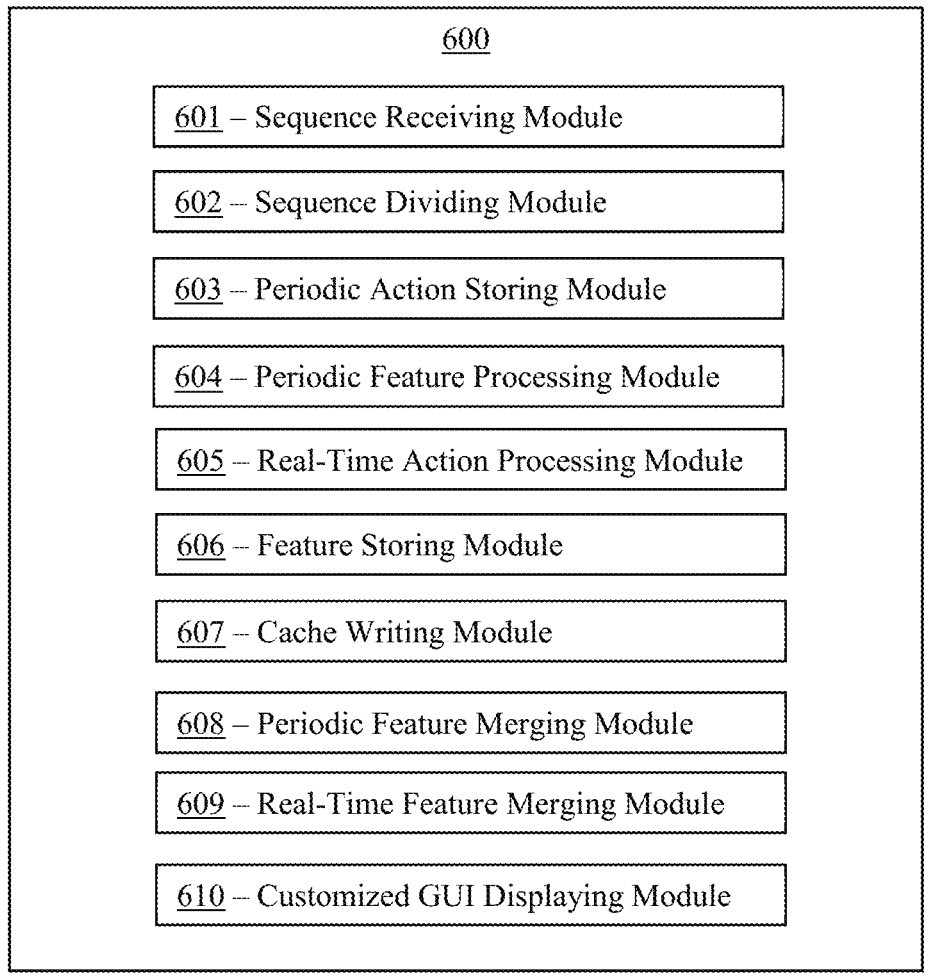
FIG. 6 illustrates a representative block diagram of a system, according to an additional embodiment.

Turning ahead in the drawings, FIG. 6 illustrates a block diagram of a system 600 that can be employed for feature ingestion and management. System 600 is merely exemplary and embodiments of the system are not limited to the embodiments presented herein. System 600 can be employed in many different embodiments or examples not specifically depicted or described herein. In some embodiments, certain elements or modules of system 600 can perform various procedures, processes, and/or activities. In these or other embodiments, the procedures, processes, and/or activities can be performed by other suitable elements or modules of system 600. In many embodiments, system 600 (or a portion thereof) can be stored within web server 310 (FIG. 3), user device 330 (FIG. 3), user action storage 410 (FIG. 4), real-time feature processor 420 (FIG. 4), periodic action storage 430 (FIG. 4), feature processor 440 (FIG. 4), stream database 450 (FIG. 4), and/or cache writer 460 (FIG. 4).

Generally, therefore, system 600 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 600 described herein.

In many embodiments, system 600 can comprise non-transitory memory storage module 601. Memory storage module 601 can be referred to as sequence receiving module 601. In many embodiments, sequence receiving module 601 can store computing instructions configured to run on one or more processing modules and perform one or more acts of method 500 (FIG. 5) (e.g., activity 501 (FIG. 5)).

In many embodiments, system 600 can comprise non-transitory memory storage module 602. Memory storage module 602 can be referred to as sequence dividing module 602. In many embodiments, sequence dividing module 602 can store computing instructions configured to run on one or more processing modules and perform one or more acts of method 500 (FIG. 5) (e.g., activity 502 (FIG. 5)).

In many embodiments, system 600 can comprise non-transitory memory storage module 603. Memory storage module 603 can be referred to as periodic action storing module 603. In many embodiments, periodic action storing module 603 can store computing instructions configured to run on one or more processing modules and perform one or more acts of method 500 (FIG. 5) (e.g., activity 503 (FIG. 5)).

In many embodiments, system 600 can comprise non-transitory memory storage module 604. Memory storage module 604 can be referred to as periodic feature processing module 604. In many embodiments, periodic feature processing module 604 can store computing instructions configured to run on one or more processing modules and perform one or more acts of method 500 (FIG. 5) (e.g., activity 504 (FIG. 5)).

In many embodiments, system 600 can comprise non-transitory memory storage module 605. Memory storage module 605 can be referred to as real-time action processing module 605. In many embodiments, real-time action processing module 605 can store computing instructions configured to run on one or more processing modules and perform one or more acts of method 500 (FIG. 5) (e.g., activity 505 (FIG. 5)).

In many embodiments, system 600 can comprise non-transitory memory storage module 606. Memory storage module 606 can be referred to as feature storing module 606. In many embodiments, feature storing module 606 can store computing instructions configured to run on one or more processing modules and perform one or more acts of method 500 (FIG. 5) (e.g., activity 506 (FIG. 5)).

In many embodiments, system 600 can comprise non-transitory memory storage module 607. Memory storage module 607 can be referred to as cache writing module 607. In many embodiments, cache writing module 607 can store computing instructions configured to run on one or more processing modules and perform one or more acts of method 500 (FIG. 5) (e.g., activity 507 (FIG. 5)).

In many embodiments, system 600 can comprise non-transitory memory storage module 608. Memory storage module 608 can be referred to as periodic feature merging module 608. In many embodiments, periodic feature merging module 608 can store computing instructions configured to run on one or more processing modules and perform one or more acts of method 500 (FIG. 5) (e.g., activity 508 (FIG. 5)).

In many embodiments, system 600 can comprise non-transitory memory storage module 609. Memory storage module 609 can be referred to as real-time feature merging module 609. In many embodiments, real-time feature merging module 609 can store computing instructions configured to run on one or more processing modules and perform one or more acts of method 500 (FIG. 5) (e.g., activity 509 (FIG. 5)).

In many embodiments, system 600 can comprise non-transitory memory storage module 610. Memory storage module 610 can be referred to as customized GUI displaying module 610. In many embodiments, customized GUI displaying module 610 can store computing instructions configured to run on one or more processing modules and perform one or more acts of method 500 (FIG. 5) (e.g., activity 510 (FIG. 5)).

Although systems and methods for feature ingestion and management have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 5 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, cause the one or more processors to perform functions comprising:
      receiving a sequence of actions entered into a graphical user interface (GUI) of a user, wherein the sequence of actions are received before an account action for a user account of the user during a user session is initiated via a first user portal, wherein the user session persists across multiple access portals when the GUI is closed and wherein the multiple access portals comprise the first user portal;
      dividing the sequence of actions into actions for real-time features and actions for periodic features;
      simultaneously (1) storing the actions for the periodic features in a distributed cloud storage system and (2) processing the actions for the real-time features into the real-time features;
      simultaneously storing the periodic features and the real-time features in a database managed by real-time stream processing software;
      grouping the periodic features and the real-time features, as stored, into one or more sequences; and
      accessing the periodic features and the real-time features, as stored and grouped, in an order dictated by the one or more sequences.

2. The system of claim 1, wherein the computing instructions, when executed on the one or more processors, further cause the one or more processors to perform:
   writing the periodic features and the real-time features from the database managed by the real-time stream processing software to a large capacity cache.

3. The system of claim 2, wherein the computing instructions, when executed on the one or more processors, further cause the one or more processors to perform a function comprising:
   using the periodic features and the real-time features, as stored in the large capacity cache, to coordinate displaying one or more customized graphical user interfaces during the user session.

4. The system of claim 2, wherein writing the periodic features and the real-time features to the large capacity cache comprises:
   writing the periodic features and the real-time features from the database managed by the real-time stream processing software to at least one regional cache node of the large capacity cache.

5. The system of claim 2, wherein only one writer is used to write the periodic features and the real-time features to the large capacity cache.

6. The system of claim 2, wherein the computing instructions, when executed on the one or more processors, further cause the one or more processors to perform functions comprising:
   receiving one or more additional actions entered into the GUI after the account action for the user account of the user during the user session;
   dividing the one or more additional actions into one or more additional actions for one or more additional real-time features and one or more additional actions for one or more additional periodic features;
   merging the one or more additional periodic features with the periodic features in the large capacity cache; and
   merging the one or more additional real-time features with the real-time features in the large capacity cache.

7. The system of claim 6, wherein receiving the one or more additional actions entered into the GUI after the account action for the user account of the user during the user session comprises:

receiving the one or more additional actions entered into the GUI after the account action for the user account of the user during the user session, wherein the one or more additional actions are initiated via a second user portal different than the first user portal and wherein the multiple access portals comprise the second user portal.

8. The system of claim 1, wherein simultaneously storing the periodic features and the real-time features in the database managed by the real-time stream processing software comprises:
   continually streaming the real-time features to the database managed by the real-time stream processing software; and
   streaming the periodic features to the database managed by the real-time stream processing software at one or more predetermined times.

9. The system of claim 1, wherein the account action for the user account of the user during the user session comprises:
   logging into an existing user account of the user;
   logging out of the existing user account of the user;
   registering a new user account for the user;
   upgrading a trial user account of the user to a paid user account of the user; or
   cancelling a user account of the user.

10. The system of claim 1, wherein the real-time stream processing software maintains the database in active-active mode.

11. A method being implemented via execution of computing instructions configured to run at one or more processors and stored at non-transitory computer-readable media, the method comprising:
   receiving a sequence of actions entered into a graphical user interface (GUI) of a user, wherein the sequence of actions are received before an account action for a user account of the user during a user session is initiated via a first user portal, wherein the user session persists across multiple access portals when the GUI is closed and wherein the multiple access portals comprise the first user portal;
   dividing the sequence of actions into actions for real-time features and actions for periodic features;
   simultaneously (1) storing the actions for the periodic features in a distributed cloud storage system and (2) processing the actions for the real-time features into the real-time features;
   simultaneously storing the periodic features and the real-time features in a database managed by real-time stream processing software;
   grouping the periodic features and the real-time features, as stored, into one or more sequences; and
   accessing the periodic features and the real-time features, as stored and grouped, in an order dictated by the one or more sequences.

12. The method of claim 11, further comprising:
   writing the periodic features and the real-time features from the database managed by the real-time stream processing software to a large capacity cache.

13. The method of claim 12, further comprising:
   using the periodic features and the real-time features, as stored in the large capacity cache, to coordinate displaying one or more customized graphical user interfaces during the user session.

14. The method of claim 12, wherein writing the periodic features and the real-time features to the large capacity cache comprises:
   writing the periodic features and the real-time features from the database managed by the real-time stream processing software to at least one regional cache node of the large capacity cache.

15. The method of claim 12, wherein only one writer is used to write the periodic features and the real-time features to the large capacity cache.

16. The method of claim 12, further comprising:
   receiving one or more additional actions entered into the GUI after the account action for the user account of the user during the user session;
   dividing the one or more additional actions into one or more additional actions for one or more additional real-time features and one or more additional actions for one or more additional periodic features;
   merging the one or more additional periodic features with the periodic features in the large capacity cache; and
   merging the one or more additional real-time features with the real-time features in the large capacity cache.

17. The method of claim 16, wherein receiving the one or more additional actions entered into the GUI after the account action for the user account of the user during the user session comprises:
   receiving the one or more additional actions entered into the GUI after the account action for the user account of the user during the user session, wherein the one or more additional actions are initiated via a second user portal different than the first user portal and wherein the multiple access portals comprise the second user portal.

18. The method of claim 11, wherein simultaneously storing the periodic features and the real-time features in the database managed by the real-time stream processing software comprises:
   continually streaming the real-time features to the database managed by the real-time stream processing software; and
   streaming the periodic features to the database managed by the real-time stream processing software at one or more predetermined times.

19. The method of claim 11, wherein the account action for the user account of the user during the user session comprises:
   logging into an existing user account of the user;
   logging out of the existing user account of the user;
   registering a new user account for the user;
   upgrading a trial user account of the user to a paid user account of the user; or
   cancelling a user account of the user.

20. The method of claim 11, wherein the real-time stream processing software maintains the database in active-active mode.

* * * * *